United States Patent
Marathe

(10) Patent No.: US 11,538,452 B2
(45) Date of Patent: Dec. 27, 2022

(54) METHOD FOR OPERATING A VEHICLE-MOUNTED ACOUSTIC SIGNAL-GENERATING DEVICE

(71) Applicant: ASK INDUSTRIES GMBH, Niederwinkling (DE)

(72) Inventor: Srinidhi Sadashiva Marathe, Niederwinkling (DE)

(73) Assignee: ASK INDUSTRIES GMBH, Niederwinkling (DE)

( * ) Notice: Subject to any disclaimer, the term of this patent is extended or adjusted under 35 U.S.C. 154(b) by 0 days.

(21) Appl. No.: 16/620,872

(22) PCT Filed: May 15, 2018

(86) PCT No.: PCT/EP2018/062618
§ 371 (c)(1),
(2) Date: Dec. 9, 2019

(87) PCT Pub. No.: WO2018/224254
PCT Pub. Date: Dec. 13, 2018

(65) Prior Publication Data
US 2020/0202834 A1    Jun. 25, 2020

(30) Foreign Application Priority Data
Jun. 9, 2017    (DE) .......................... 102017112761.5

(51) Int. Cl.
*G10K 11/178* (2006.01)
*B60R 11/02* (2006.01)
*G08G 1/056* (2006.01)

(52) U.S. Cl.
CPC .... *G10K 11/17837* (2018.01); *B60R 11/0217* (2013.01); *G08G 1/056* (2013.01);
(Continued)

(58) Field of Classification Search
None
See application file for complete search history.

(56) References Cited

U.S. PATENT DOCUMENTS

| | | | | |
|---|---|---|---|---|
| 5,907,622 A | * | 5/1999 | Dougherty | H03G 3/32 381/108 |
| 2011/0112746 A1 | * | 5/2011 | Takazawa | G08G 1/161 701/117 |

(Continued)

FOREIGN PATENT DOCUMENTS

| | | |
|---|---|---|
| DE | 102010005802 A1 | 7/2011 |
| DE | 102010006303 A1 | 8/2011 |

(Continued)

OTHER PUBLICATIONS

DE 102015224382 A1 English machine translation (Year: 2017).*
(Continued)

*Primary Examiner* — James K Mooney
(74) *Attorney, Agent, or Firm* — Rimon PC

(57) ABSTRACT

Method for operating a vehicle-mounted acoustic signal-generating device (8), which is configured to generate an acoustic compensation signal (2) for compensating acoustic interference signals (3), which result from a stream of vehicles (5) coming towards a vehicle (4) in question, comprising the steps: —detection of a stream of vehicles (5) coming towards a vehicle (4) in question, and generation of detection information describing at least one parameter of the stream of vehicles, —determination of an acoustic interference signal (3) resulting from the stream of vehicles (5) coming towards the vehicle (4) in question on the basis of the detection information, —generation of an acoustic compensation signal (2) for compensating the acoustic interference signal (3) resulting from the stream of vehicles (5) coming towards the vehicle (4) in question.

9 Claims, 2 Drawing Sheets

Figure 1:
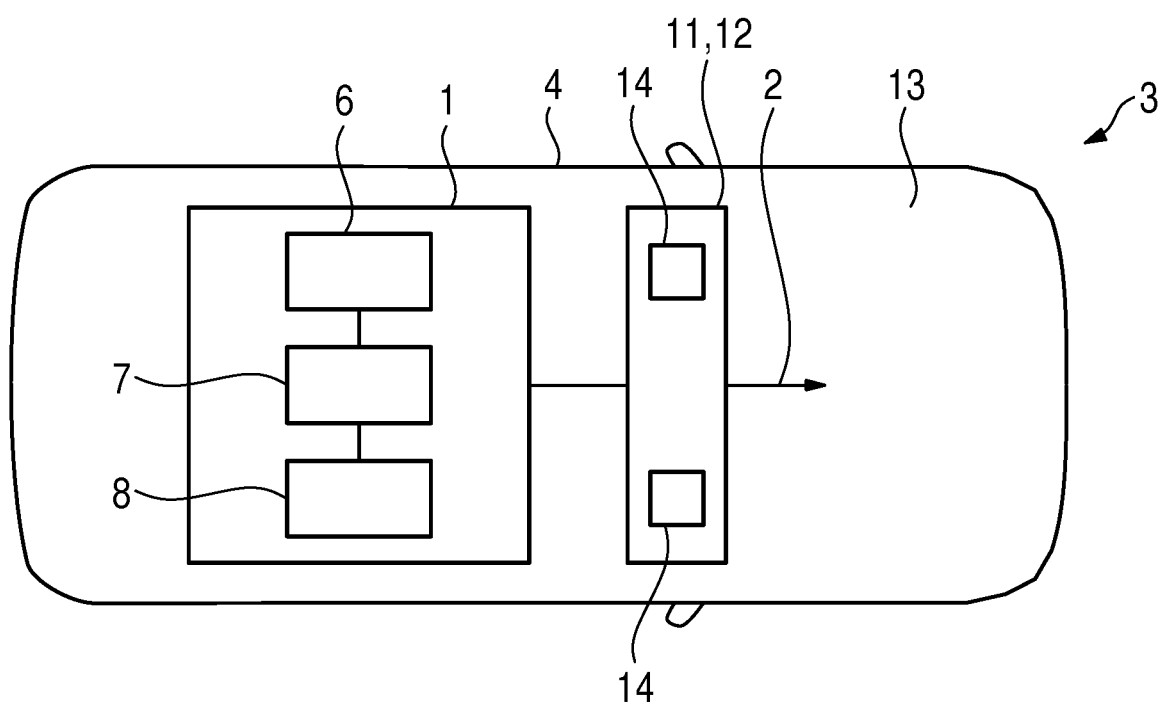

(52) U.S. Cl.
CPC ............... *G10K 2210/1282* (2013.01); *G10K 2210/3028* (2013.01); *G10K 2210/30231* (2013.01)

(56) References Cited

U.S. PATENT DOCUMENTS

| | | |
|---|---|---|
| 2012/0230504 A1 | 9/2012 | Kuroda et al. |
| 2014/0241532 A1* | 8/2014 | Sato .................... G01S 3/86 381/56 |
| 2015/0012267 A1 | 1/2015 | Rill et al. |
| 2016/0071508 A1 | 3/2016 | Wurm et al. |
| 2016/0125869 A1* | 5/2016 | Kulavik ........... G10K 11/17885 381/71.6 |

FOREIGN PATENT DOCUMENTS

| | | |
|---|---|---|
| DE | 102010016653 A1 | 10/2011 |
| DE | 102015224382 A1 | 6/2017 |

OTHER PUBLICATIONS

"30 km/h zone." Wikipedia, May 24, 2017, en.wikipedia.org/w/index.php?title=30_km/h_zone&oldid=782066502 (Year: 2017).*

\* cited by examiner

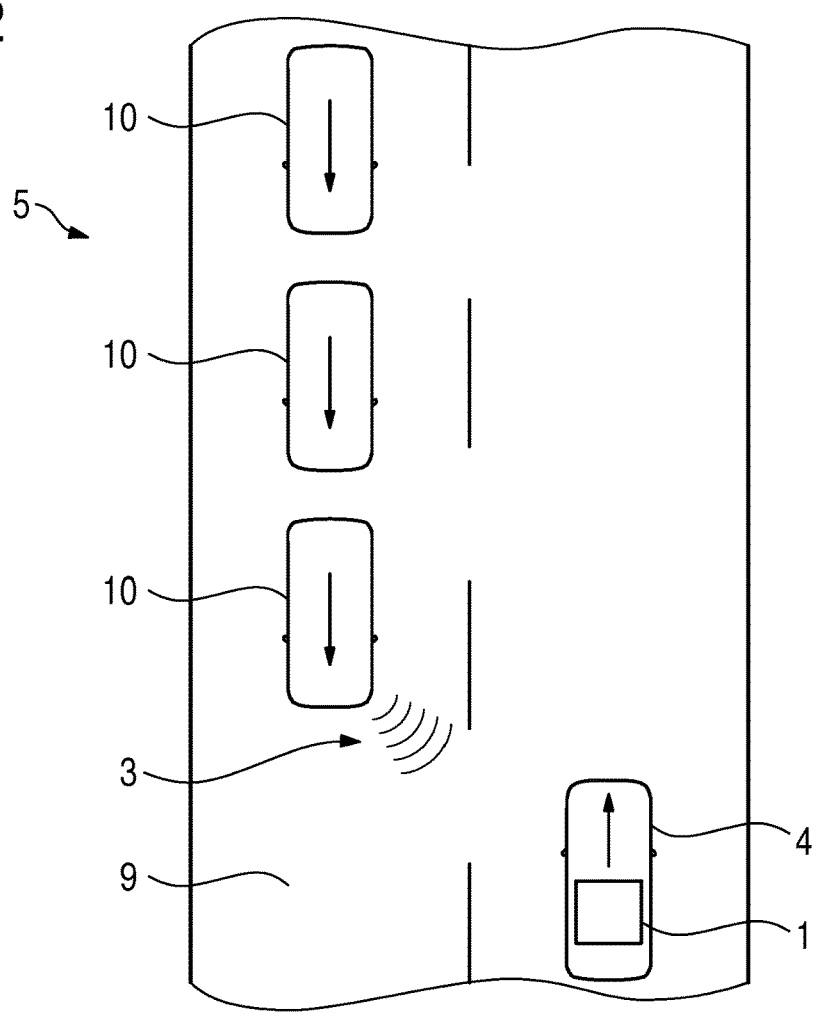
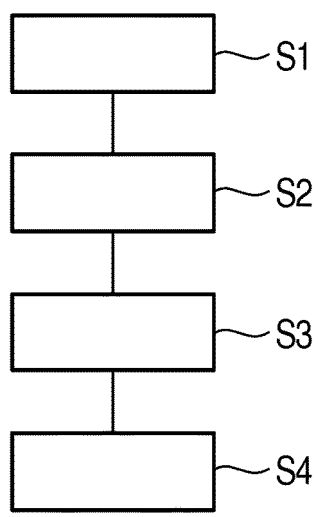

METHOD FOR OPERATING A VEHICLE-MOUNTED ACOUSTIC SIGNAL-GENERATING DEVICE

CROSS-REFERENCE TO RELATED APPLICATIONS

This application claims priority to Patent Cooperation Treaty application serial number PCT/EP 2018/062618, filed May 15, 2018, which claims priority to German patent application serial number DE 10 2017 112 761.5, filed Jun. 9, 2017, the contents of each of which are incorporated herein by reference in their entirety.

The invention relates to a method for operating a vehicle-mounted acoustic signal-generating device, which is configured to generate an acoustic compensation signal for compensating acoustic interference signals, which result from a stream of vehicles coming towards the vehicle in question.

As is known, when driving a vehicle, i.e. in particular a motor vehicle, acoustic interference signals (background noise) arise due to traffic coming towards the vehicle in question, i.e. a stream of vehicles coming towards the vehicle in question, which signals can frequently be perceived as disruptive by vehicle occupants, as they can or do have a negative effect on the acoustic situation existing in the vehicle interior of the vehicle in question.

Pertinent acoustic interference signals can specifically impair the acoustic perception, for example, of audio signals or content, i.e. e.g. music, speech etc., output via an audio output device mounted in a (motor) vehicle, something which is frequently experienced as disruptive by vehicle occupants. In an analogous manner, pertinent acoustic interference signals can also be perceived as disruptive, however, for the reason that they can adversely affect a certain acoustic situation, i.e. e.g. a quiet situation, or a conversation involving one or more passengers—these are other examples of a given acoustic situation in a vehicle interior.

Starting out from this, the object of the invention is to specify a method for operating a (motor) vehicle-mounted acoustic signal-generating device, which reduces the impairment described due to acoustic interference signals arising when driving a vehicle due to traffic coming towards the vehicle in question, i.e. a stream of vehicles coming towards the vehicle in question.

The object is achieved by a method for operating a (motor) vehicle-mounted acoustic signal-generating device, which is configured to generate an acoustic compensation signal for compensating acoustic interference signals, which result from a stream of vehicles coming towards the vehicle in question, according to claim 1. The dependent claims for this relate to possible embodiments of the method.

The method described here is generally geared to generating an acoustic compensation signal for compensating acoustic interference signals, which result from a stream of vehicles, i.e. typically an oncoming line of vehicles, i.e. a plurality of oncoming vehicles in the form of a line, typically coming towards a vehicle in question, i.e. typically a motor vehicle, in particular in the form of a passenger car, typically on an opposite carriageway or lane. In particular, the method is geared to the operation of a motor-vehicle-mounted acoustic signal-generating device ("signal-generating device"), which is configured to generate an acoustic compensation signal for compensating acoustic interference signals resulting from a stream of vehicles coming towards a vehicle in question. The signal-generating device operated according to the method and implemented in terms of hardware and/or software can form a functional component of a vehicle-mounted audio output device, which is configured to output audio signals into a passenger compartment of a vehicle equipped with this. A corresponding audio output device can in turn form a functional component of a vehicle-mounted multimedia output device, which is configured to output acoustic and optical multimedia signals into the passenger compartment of a vehicle equipped with this.

The method is characterized by the method steps described in greater detail below:

In a first method step, detection takes place of a stream of vehicles coming towards a vehicle in question, which is understood to be the vehicle equipped with the signal-generating device operated according to the method, and detection information describing at least one parameter of the oncoming stream of vehicles is generated. In the first method step an oncoming stream of vehicles is accordingly detected and detection information describing at least one parameter of the oncoming stream of vehicles is generated. A stream of vehicles can be detected in particular as such when several, i.e. in particular at least three, vehicles come towards the vehicle in question, in particular in the form of a line; a stream of vehicles can accordingly be an oncoming line of vehicles, in particular comprising at least three vehicles.

A pertinent parameter of the oncoming stream of vehicles can generally be any parameter describing the oncoming stream of vehicles qualitatively or quantitatively. Typically this is a parameter from which an acoustic interference signal resulting relative to the vehicle in question from the stream of vehicles coming towards it can be determined by means of suitable data processing algorithms.

The detection of the oncoming stream of vehicles can take place by at least one suitable vehicle-mounted detection device, which is configured to detect corresponding parameters of the oncoming stream of vehicles. The detection of the oncoming stream of vehicles can take place e.g. by means of an acoustic, in particular ultrasound-based, and/or an electromagnetic, in particular radar-based, and/or an optical, in particular laser-based, detection device. It is possible that to detect corresponding parameters of an oncoming stream of vehicles, detection devices that are already present on the vehicle, which form e.g. functional components of vehicle-mounted driver assistance systems, i.e. e.g. longitudinal and/or transverse control assistance systems used for the (partially) autonomous longitudinal and/or transverse control of the vehicle, are used if necessary. It is naturally possible to detect an oncoming stream of vehicles by several different detection devices, i.e. devices based on different methods of detection.

In a second method step following the first method step, determination takes place of an acoustic interference signal (background noise) resulting from the stream of vehicles coming towards the vehicle in question on the basis of the detection information. In the second method step, based on the detection information generated in the first method step and the parameters described therein of the stream of vehicles coming towards the vehicle in question, an acoustic interference signal resulting from the stream of vehicles coming towards the vehicle in question is determined accordingly. In the second method step, the parameters of the oncoming stream of vehicles detected in the first method step and described in corresponding detection information are therefore evaluated with regard to an acoustic interference signal resulting from the oncoming stream of vehicles.

The determination of the acoustic interference signal takes place, as mentioned, by means of suitable data processing algorithms. Appropriate data processing algorithms can e.g. be configured to determine a relevant acoustic interference signal by means of the detected (averaged or mean) speed of a stream of vehicles coming towards the vehicle in question or the detected (averaged or mean) relative speed of the oncoming stream of vehicles relative to the vehicle in question—the speed or relative speed in each case is an example of a parameter detected in the first method step. Determination of a relevant acoustic interference signal can also be understood as an estimation of a relevant acoustic interference signal.

In a third method step following the second method step, generation takes place of an acoustic compensation signal for compensating the acoustic interference signal resulting from the stream of vehicles coming towards the vehicle in question. In the third method step, an acoustic compensation signal serving as compensation—attenuation, cancellation or also (acoustic) masking can be understood by this—of the acoustic interference signal resulting from the stream of vehicles coming towards the vehicle in question is generated. The acoustic compensation signal is typically generated with acoustic properties, i.e. e.g. amplitude, phase, frequency, causing an attenuation or cancellation or masking of the acoustic interference signal. The acoustic properties of the compensation signal generated can thus be selected so that, typically on account of negative interference, attenuation or cancellation of the acoustic interference signal can take place.

The acoustic compensation signal is generated by means of the signal-generating device.

In a fourth method step typically following the third method step, an output of the acoustic compensation signal generated naturally takes place into the passenger compartment of the vehicle in question for actually compensating the acoustic interference signal. The acoustic compensation signal generated can be output via suitable output devices, i.e. e.g. loudspeaker devices, which can form a functional component of a vehicle-mounted audio output or multimedia output device, into the passenger compartment of the vehicle in question.

The method described provides an efficient and reliable compensation of acoustic interference signals, which result from a stream of vehicles coming towards a vehicle in question, and efficient and reliable operation of a (motor) vehicle-mounted acoustic signal-generating device, which is configured for generating an acoustic compensation signal for compensating acoustic interference signals that result from a stream of vehicles coming towards a vehicle in question.

The determination of the acoustic interference signal can take place via a correlation of at least one parameter of the detected oncoming stream of vehicles described by corresponding detection information with certain properties of the acoustic interference signal resulting from the detected stream of vehicles. The data processing algorithms implemented according to the method can be configured accordingly to determine a correlation between parameters of the detected oncoming stream of vehicles and certain properties of the acoustic interference signal resulting from the detected stream of vehicles, so that based on the detected oncoming stream of vehicles or on detected parameters of the detected oncoming stream of vehicles, conclusions can be drawn as to the acoustic interference signal resulting from the oncoming stream of vehicles.

As examples of parameters of the detected oncoming stream of vehicles, its speed and the relative speed relative to the vehicle in question were already stated above. Alternatively or in addition, however, corresponding parameters can also be the number of vehicles in the oncoming stream of vehicles, the type of vehicles, i.e. e.g. trucks, cars etc., in the oncoming stream of vehicles, the order of the type of vehicles in the oncoming stream of vehicles etc. The above list is by way of example and is not conclusive.

According to the method, at least one driving parameter describing the state of driving of the vehicle in question can also be detected alternatively or in addition, wherein the acoustic compensation signal is generated taking account of the at least one driving parameter describing the state of driving of the vehicle in question, in particular the acceleration, speed etc. of the vehicle in question. By additionally considering driving parameters describing the driving state of the vehicle in question, the acoustic compensation signal can be generated adapted more exactly with regard to a currently existing driving or traffic situation, as the generation of the acoustic compensation signal is based on a comprehensive "image" of the currently existing driving or traffic situation. The detection of driving parameters describing the driving state of the vehicle in question can take place by means of suitable detection devices, i.e. e.g. acceleration or speed detection devices.

It is thus possible to generate an acoustic compensation signal at all only under certain conditions. For example, it is possible that an acoustic compensation signal is only generated if the vehicle in question is moving above a certain minimum speed, in particular a minimum speed in a range between 25 and 35 km/h. This takes account of the circumstance that pertinent acoustic interference signals are frequently only perceived as disruptive above a certain, if applicable vehicle-specific, minimum speed, so that the generation of an acoustic compensation signal is not necessarily required below the minimum speed. In such a way the computing power required to carry out the method, i.e. in particular for generating the acoustic compensation signal, can be reduced on the one hand, while on the other hand any influencing of the output of audio signals or content into the passenger compartment can be avoided by the acoustic compensation signal.

According to the method, the acoustic situation existing in the passenger compartment of the vehicle in question can be detected, wherein the acoustic compensation signal is generated taking account of the acoustic situation existing in the passenger compartment of the vehicle in question. By additionally taking account of the acoustic situation existing in the passenger compartment, which is influenced e.g. by audio signals or content output into the passenger compartment, i.e. e.g. music, language etc., conversations of passengers in the passenger compartment, the loading of the passenger compartment and physical parameters prevailing in the passenger compartment, such as e.g. humidity, pressure, temperature, the acoustic compensation signal can be generated adapted more exactly in regard to the acoustic situation currently existing in the passenger compartment, as the generation of the acoustic compensation signal is (also) based on a comprehensive "image" of the acoustic situation currently existing in the passenger compartment. The detection of the acoustic situation in the passenger compartment can take place by means of suitable detection devices, i.e. e.g. microphone devices.

It is possible in this case that the acoustic compensation signal is generated with a frequency range that corresponds to the frequency range of the acoustic situation existing in the passenger compartment of the vehicle in question, in particular to an audio signal or content reproduced in the passenger compartment or the acoustic compensation signal is generated with a frequency range that corresponds to a sub-frequency range of the acoustic situation existing in the passenger compartment. The acoustic compensation signal can be acoustically masked by the acoustic situation currently existing in the passenger compartment, so that its output is scarcely noticed or is not noticed by a passenger.

According to the method the acoustic situation existing outside of a passenger compartment of the vehicle in question can also be detected alternatively or in addition, wherein the acoustic compensation signal is generated taking account of the acoustic situation existing outside of the passenger compartment of the vehicle in question. By additionally considering the acoustic situation existing outside of the passenger compartment of the vehicle in question, which is influenced e.g. by local and/or time parameters of the environment in which the vehicle in question is located/moving—for example, the acoustic situation outside of the passenger compartment for a journey through an urban environment can differ from a journey through a rural environment, or can differ for a journey in the daytime from a journey at night—the acoustic compensation signal can be generated adapted more exactly in regard to the acoustic situation currently existing outside of the passenger compartment, as the generation of the acoustic compensation signal is (also) based on a comprehensive "image" of the acoustic situation currently existing outside of the passenger compartment. The detection of the acoustic situation outside of the passenger compartment can take place by means of suitable detection devices, i.e. e.g. microphone devices.

The acoustic compensation signal can be generated as a defined acoustic pulse ("boost") of certain acoustic properties, i.e. in particular of a certain amplitude, frequency and length. It is therefore possible to output the acoustic compensation signal in a pulse-like or pulsed manner in order to compensate the acoustic interference signal targetedly, as mentioned, e.g. by attenuation, cancellation or acoustic masking. To generate an appropriately pulse-like or pulsed acoustic compensation signal, the signal-generating device can be designed e.g. as a decompressor device or can comprise such a device.

It is naturally possible to generate a corresponding defined acoustic pulse taking into account a dynamic limit value that can be or is specified e.g. by the user, so that the acoustic pulse generated does not exceed the dynamic limit value. Any influencing of the output of audio signals or content into the passenger compartment by the acoustic compensation signal can be avoided in such a way.

As well as relating to the method described, the invention relates to an apparatus typically installed on the (motor) vehicle for generating an acoustic compensation signal for compensating acoustic interference signals, which result from a stream of vehicles coming towards a vehicle in question. The apparatus comprises in particular:
  a detection device implemented in terms of hardware and/or software, which is configured to detect a stream of vehicles coming towards a vehicle in question and to generate detection information describing at least one parameter of the vehicle stream,
  a determination device implemented in terms of hardware and/or software, which is configured to determine an acoustic interference signal resulting from the stream of vehicles coming towards the vehicle in question on the basis of the detection information,
  a signal-generating device implemented in terms of hardware and/or software, which is configured to generate an acoustic compensation signal for compensating the acoustic interference signal resulting from the stream of vehicles coming towards the vehicle in question.

Furthermore, the invention relates to a vehicle or motor vehicle comprising a corresponding apparatus.

The apparatus is configured to execute the method described so that all statements in connection with method apply by analogy to the apparatus and to the motor vehicle.

The invention is explained once more below by means of exemplary embodiments with reference to the enclosed drawings. These show:

FIG. 1 a schematic diagram of an apparatus for generating an acoustic compensation signal according to an exemplary embodiment;

FIG. 2 a schematic diagram of a vehicle equipped with the apparatus shown in FIG. 1 in a certain traffic situation; and FIG. 3 a flow chart for illustrating the method steps of a method according to an exemplary embodiment.

FIG. 1 shows a schematic diagram of an apparatus 1 for generating an acoustic compensation signal 2 for compensating acoustic interference signals 3, which result from a stream of vehicles 5 coming towards a vehicle 4 in question, according to an exemplary embodiment.

The apparatus 1 installed in a vehicle 4, i.e. e.g. a car, comprises a detection device 6, a determination device 7 and a signal-generating device 8.

The detection device 6, which is implemented in terms of hardware and/or software, is configured to detect a stream of vehicles 5 coming towards the vehicle 4 ("vehicle in question") equipped with the apparatus 1 and to generate detection information describing at least one parameter of the vehicle stream 5.

The determination device 7, which is implemented in terms of hardware and/or software, is configured to determine an acoustic interference signal 3 resulting from the stream of vehicles 5 coming towards the vehicle 4 in question on the basis of the detection information.

The acoustic signal-generating device 8, which is implemented in terms of hardware and/or software, is configured to generate an acoustic compensation signal 2 for compensating the acoustic interference signal 3 resulting from the stream of vehicles 5 coming towards the vehicle 4 in question. The signal-generating device 8 can form a functional component of a vehicle-mounted audio output device 11, which is configured to output audio signals into the passenger compartment 13 of the vehicle 4 equipped with this. The audio output device 11 can in turn form a functional component of a vehicle-mounted multimedia output device 12, which is configured to output acoustic and optical multimedia signals into the passenger compartment 13 of the vehicle 4 equipped with this.

The apparatus 1 is configured to execute a method for operating a vehicle-mounted acoustic signal-generating device 8, which is configured to generate an acoustic compensation signal 2 for compensating acoustic interference signals 3, which result from a stream of vehicles 5 coming towards a vehicle 4 in question.

The substantial method steps of the method are depicted in the flow chart shown in FIG. 3 and are explained in further detail below.

The method is generally geared to the generation of at least one acoustic compensation signal 2 for compensating acoustic interference signals 3, which result from an oncoming stream of vehicles 5, i.e. typically an oncoming line of vehicles, i.e. a plurality of oncoming vehicles 10 in the form of a line (driving direction depicted by the arrow pointing downwards in FIG. 2), coming towards a vehicle 4 in question, typically on an opposite carriageway 9 or lane, cf.

FIG. 2, which shows a schematic diagram of a vehicle 4 equipped with the apparatus 1 shown in FIG. 1 (driving direction depicted by the arrow pointing upwards in FIG. 2), in a certain traffic situation.

The method is accordingly targeted at the operation of the vehicle-mounted signal-generating device 8, which is configured to generate an acoustic compensation signal 2 for compensating acoustic interference signals 3, which result from the stream of vehicles 5 coming towards the vehicle 4 in question.

In a first method step S1, cf. FIG. 3, detection takes place of a vehicle stream 5 coming towards a vehicle 4 in question and generation of detection information describing at least one parameter of the oncoming stream of vehicles. In the first method step, an oncoming stream of vehicles 5 is detected accordingly and detection information describing at least one parameter of the oncoming stream of vehicles 5 is generated.

A pertinent parameter of the oncoming stream of vehicles 5 is generally any parameter describing the oncoming stream of vehicles 5 qualitatively or quantitatively. This is typically a parameter from which an acoustic interference signal 3 resulting from the oncoming vehicle stream 5 relative to the vehicle 4 in question can be determined by means of suitable data processing algorithms.

The detection of the oncoming stream of vehicles 5 takes place by means of the detection device 6, which is configured to detect relevant parameters of the oncoming stream of vehicles 5. The detection device 6 can specifically be e.g. an acoustic, in particular ultrasound-based, and/or an electromagnetic, in particular radar-based, and/or an optical, in particular laser-based, detection device 6.

In a second method step S2 following the first method step S1, cf. FIG. 3, determination of an acoustic interference signal 3 resulting from the stream of vehicles 5 coming towards the vehicle 4 in question takes place by means of the determination device 7 on the basis of the detection information. In the second method step S2, based on the detection information generated in the first method step S1 and the parameters described therein of the stream of vehicles 5 coming towards the vehicle 4 in question, an acoustic interference signal 3 resulting from the stream of vehicles 5 coming towards the vehicle 4 in question is determined accordingly. In the second method step S2, the parameters of the oncoming stream of vehicles 5 detected in the first method step S1 and described in corresponding detection information are therefore evaluated with regard to an acoustic interference signal 3 resulting from the oncoming stream of vehicles 5.

The determination of the interference signal 3 takes place, as mentioned, by means of the determination device 7 and the data processing algorithms stored in this. Appropriate data processing algorithms can be configured e.g. to determine by means of the detected (mean) speed of the vehicle stream 5 coming towards the vehicle 4 in question or by means of the detected (mean) relative speed of the oncoming vehicle stream 5 relative to the vehicle 4 in question—the speed and the relative speed are each an example of a parameter detected in the first method step S1—a relevant interference signal 3.

In a third method step S3 following the second method step S2, cf. FIG. 3, generation takes place by means of the signal-generating device 8 of an acoustic compensation signal 2 for compensating the interference signal 3. In the third method step S3 a compensation signal 2 acting as compensation—this can be understood as an attenuation, cancellation and also an (acoustic) masking—of the interference signal 3 is therefore generated. The compensation signal 2 is typically generated with acoustic properties, i.e. e.g. amplitude, phase, frequency, causing attenuation or cancellation or masking of the interference signal 3. The acoustic properties of the compensation signal 2 generated can therefore be selected in such a way that attenuation or cancellation of the interference signal 3 is possible, typically due to negative interference.

In a fourth method step S4 following the third method step S3, cf. FIG. 3, an output of the compensation signal 2 generated into the passenger compartment 13 of the vehicle 4 in question takes place for actual compensation of the interference signal 3. The compensation signal 2 generated can be output via suitable output devices 14, i.e. e.g. loudspeaker devices, which can form a functional component of the vehicle-mounted audio output or multimedia output device 11, 12, into the passenger compartment 13 of the vehicle 4 in question.

The determination of the interference signal 3 can take place via a correlation of at least one parameter of the detected oncoming stream of vehicles 5 described by corresponding detection information with certain properties of the interference signal 3 resulting from the detected stream of vehicles 5. The data processing algorithms can be configured accordingly to determine a correlation between parameters of the detected stream of vehicles 5 and certain properties of the interference signal 3 resulting from the detected stream of vehicles 5, so that based on the detected stream of vehicles 5 or on detected parameters of the stream of vehicles 5, conclusions can be drawn as to the interference signal 3 resulting from the stream of vehicles 5.

As examples of parameters of the detected stream of vehicles 5, its speed and the relative speed relative to the vehicle 4 in question were already named above. Alternatively or in addition, however, corresponding parameters can also be the number of vehicles 10 in the stream of vehicles 3, the type of vehicles 10, i.e. e.g. trucks, cars etc., in the stream of vehicles 5, the order of the type of vehicles 10 in the stream of vehicles 5, etc.

According to the method, at least one driving parameter describing the state of driving of the vehicle 4 in question can also be detected, wherein the compensation signal 2 is generated taking account of the at least one driving parameter describing the state of driving of the vehicle 4 in question, in particular the acceleration, speed etc. of the vehicle 4 in question. By additionally considering driving parameters describing the driving state of the vehicle 4 in question, the compensation signal 2 can be generated adapted more exactly with regard to a currently existing driving or traffic situation, as the generation of the compensation signal 2 is based on a comprehensive "image" of the currently existing driving or traffic situation. The detection of driving parameters describing the driving state of the vehicle 4 in question can take place by means of suitable detection devices (not shown), i.e. e.g. acceleration or speed detection devices.

It is thus possible to generate the compensation signal 2 at all only under certain conditions. For example, it is possible that a compensation signal 2 is only generated if the vehicle 4 in question is moving above a certain minimum speed, in particular a minimum speed in a range between 25 and 35 km/h. This takes account of the circumstance that pertinent interference signals 3 are frequently only perceived as disruptive above a certain, if applicable vehicle-specific, minimum speed, so that the generation of a compensation signal 2 is not necessarily required below the minimum speed.

According to the method, the acoustic situation existing in the passenger compartment 13 of the vehicle 4 in question can be detected, wherein the compensation signal 2 is generated taking account of the acoustic situation existing in the passenger compartment 13 of the vehicle 4 in question. By additionally taking account of the acoustic situation existing in the passenger compartment 13 of the vehicle 4 in question, which is influenced e.g. by audio signals or content that are output into the passenger compartment 13, i.e. e.g. music, language etc., conversations of passengers in the passenger compartment 13, the loading of the passenger compartment 13 and physical parameters prevailing in the passenger compartment 13, such as e.g. humidity, pressure, temperature, the compensation signal 2 can be generated adapted more exactly in regard to the acoustic situation currently existing in the passenger compartment 13, as the generation of the compensation signal 2 is (also) based on a comprehensive "image" of the acoustic situation currently existing in the passenger compartment 13. The detection of the acoustic situation in the passenger compartment 13 can take place by means of suitable detection devices (not shown), i.e. e.g. microphone devices.

It is possible in this case that the compensation signal 2 is generated with a frequency range that corresponds to the frequency range of the acoustic situation existing in the passenger compartment 13 of the vehicle 4 in question, in particular to an audio signal or content reproduced in the passenger compartment 13 or the compensation signal 2 is generated with a frequency range that corresponds to a sub-frequency range of the acoustic situation existing in the passenger compartment 13 of the vehicle 4 in question. The compensation signal 2 can be acoustically masked by the acoustic situation currently existing in the passenger compartment 13 of the vehicle 4, so that its output is scarcely noticed or is not noticed by a passenger.

According to the method the acoustic situation existing outside of the passenger compartment 13 of the vehicle 4 can also be detected alternatively or in addition, wherein the compensation signal 2 is generated taking account of the acoustic situation existing outside of the passenger compartment 13. By additionally considering the acoustic situation existing outside of the passenger compartment 13, which is influenced e.g. by local and/or time parameters of the environment in which the vehicle 4 in question is located/moving, the compensation signal 2 can be generated adapted more exactly in regard to the acoustic situation currently existing outside of the passenger compartment 13, as the generation of the compensation signal 2 is (also) based on a comprehensive "image" of the acoustic situation currently existing outside of the passenger compartment 13. The detection of the acoustic situation outside of the passenger compartment 13 can take place by means of suitable detection devices (not shown), i.e. e.g. microphone devices.

The compensation signal 2 can be generated as a defined acoustic pulse ("boost") of certain acoustic properties, i.e. in particular of a certain amplitude, frequency and length. It is therefore possible to output the compensation signal 2 in a pulse-like or pulsed manner in order to compensate the interference signal 3 targetedly, as mentioned, e.g. by attenuation, cancellation or acoustic masking. To generate an appropriately pulse-like or pulsed compensation signal 2, the signal-generating device 8 can be designed e.g. as a decompressor device, or can comprise such a device.

It is naturally possible to generate a corresponding defined acoustic pulse taking a dynamic limit value that can be or is specified e.g. by the user into account, so that the acoustic pulse generated does not exceed the dynamic limit value.

Any influencing of the output of audio signals or content into the passenger compartment 13 by the compensation signal 2 can be avoided in such a way.

The invention claimed is:

1. A method for operating a vehicle-mounted acoustic signal-generating device, which is configured to generate an acoustic compensation signal for compensating acoustic interference signals, which result from a stream of vehicles coming towards the vehicle in question, comprising the steps:
   detection of a stream of vehicles comprising a plurality of vehicles coming towards the vehicle in question and generation of detection information describing at least one parameter of the stream of vehicles, wherein the stream of vehicles is determined as a stream of vehicles when it comprises at least three vehicles coming towards the vehicle in question in the form of a line;
   determination of an acoustic interference signal resulting from the stream of vehicles coming towards the vehicle in question on the basis of the detection information,
   generation of an acoustic compensation signal for compensating the acoustic interference signal resulting from the stream of vehicles coming towards the vehicle in question; wherein
   the acoustic compensation signal is generated, via a decompressor device configured to generate a plurality of individual acoustic pulses each having a certain amplitude, frequency and length, in a pulsed manner;
   the method further comprising:
   detecting speed of the vehicle; wherein
   the determination of the acoustic interference signal is carried out by means of data processing algorithms configured to determine the acoustic interference signal by means of the detected speed of the vehicle, wherein
   the plurality of individual acoustic pulses each having a certain amplitude, frequency and length are only generated if the speed of the vehicle in question is above a minimum speed.

2. The method of claim 1, wherein the determination of the acoustic interference signal takes place via correlation of at least one parameter of the detected stream of vehicles with certain properties of the acoustic interference signal resulting from the detected stream of vehicles.

3. The method of claim 1, wherein an acoustic situation existing in the passenger compartment of the vehicle in question is detected, wherein the acoustic compensation signal is generated taking account of an acoustic situation existing in the passenger compartment of the vehicle in question, wherein the acoustic situation comprises audio signals or audio content output within the passenger compartment.

4. The method of claim 3, wherein the acoustic compensation signal is generated with a frequency range that corresponds to the frequency range of the acoustic situation existing in the passenger compartment of the vehicle in question, or the acoustic compensation signal is generated with a frequency range that corresponds to a sub-frequency range of the acoustic situation existing in the passenger compartment of the vehicle in question.

5. The method of claim 1, wherein an acoustic situation existing outside of the passenger compartment of the vehicle in question is detected, wherein the acoustic compensation signal is generated taking account of the acoustic situation existing outside of the passenger compartment of the vehicle in question.

6. The method of claim 1, wherein the detection of the stream of vehicles takes place by means of an acoustic, and/or electromagnetic, and/or an optical, detection device.

7. The method of claim 1, wherein the minimum speed lies in a range between 25 and 35 km/h.

8. The method of claim 1, wherein the defined acoustic pulse is specified by a user of the vehicle in question at a dynamic limit value.

9. The method of claim 8, wherein the dynamic limit value is a maximum value such that the defined acoustic pulse does not exceed the dynamic limit value.

\* \* \* \* \*